United States Patent [19]
Watanabe et al.

[11] 4,101,912
[45] Jul. 18, 1978

[54] DATA RECORDING DEVICE FOR CAMERA

[75] Inventors: Yoshiaki Watanabe, Fujisawa; Akio Sunouchi, Tokyo; Youichi Okuno, Yokohama, all of Japan

[73] Assignee: Canon Kabushiki Kaisha, Tokyo, Japan

[21] Appl. No.: 715,492

[22] Filed: Aug. 18, 1976

[30] Foreign Application Priority Data

Aug. 20, 1975 [JP] Japan ................. 50/100722

[51] Int. Cl.² .................. G03B 13/02; G03B 17/24
[52] U.S. Cl. .................... 354/106; 354/219; 354/225
[58] Field of Search ............. 354/105, 106, 224, 225, 354/219, 53, 109

[56] References Cited

U.S. PATENT DOCUMENTS

| | | | |
|---|---|---|---|
| 2,135,963 | 11/1938 | Crumrine | 354/219 |
| 3,590,703 | 7/1971 | Ono | 354/106 |
| 3,732,775 | 5/1973 | Warstat | 354/225 X |
| 3,812,508 | 5/1974 | Matsuda et al. | 354/106 |
| 3,815,980 | 6/1974 | Roth | 354/109 X |
| 4,001,850 | 1/1977 | Fujita | 354/106 |

*Primary Examiner*—John Gonzales
*Attorney, Agent, or Firm*—Toren, McGeady and Stanger

[57] ABSTRACT

A data recording device for a single reflex camera has a demountable view finder in which a data signal from a source is guided by optical means along a data recording optical path and divided, for viewing and entering the camera.

3 Claims, 9 Drawing Figures

FIG.7  FIG.8
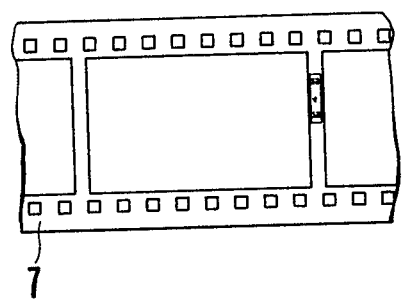
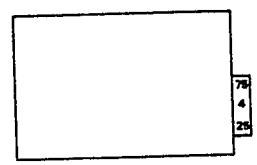
FIG.9
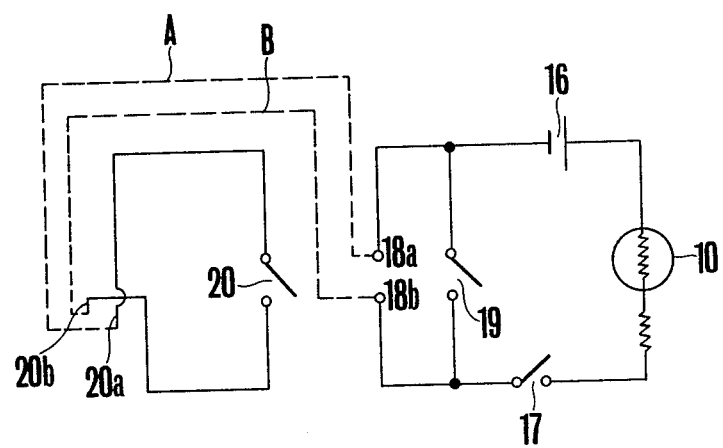

DATA RECORDING DEVICE FOR CAMERA

The present invention relates to a data recording device for a camera.

Until now single reflex cameras in which the data recording devices are built have been known, whereby it is very problematic in respect of space to build the recording optical system, the illumination source and so on in the camera body so that in many cases these means are mounted in the back cover.

However, in this way, the thickness of the camera body including the back cover becomes so large that the camera holding and the photographic operation are remarkably inconvenient, which is not profitable The purpose of the present invention is to offer a data recording system for a single reflex camera having no shortcomings as mentioned above without lowering the operability of camera.

In accordance with the present invention, the data signal source is provided in the exchangeable view finder, while the data recording optical path is being divided, in the view finder and the camera body in such a manner that the data recording is enabled, without affecting the size of the camera body.

Below the present invention will be explained in detail in accordance with the accompanying drawings of an embodiment of the present invention.

FIG. 7 shows further another film in which a data is printed in plane view.

FIG. 8 shows a data displayed in the view finder in plane view.

FIG. 9 shows a lamp circuit.

Figure 1:
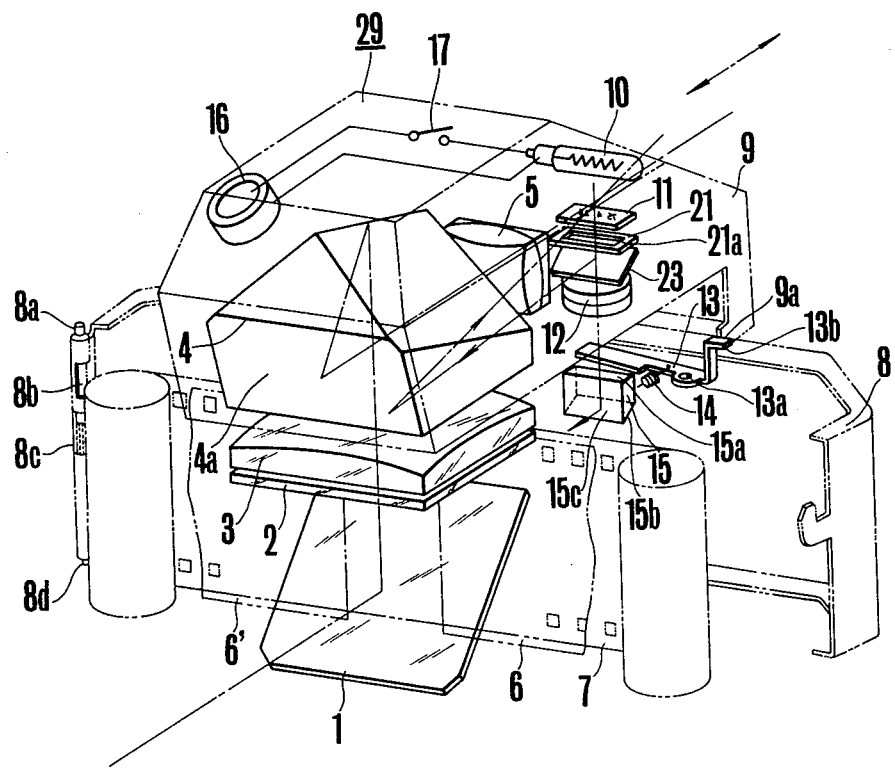
FIG. 1 shows an embodiment of the present invention in perspective view.

In FIG. 1, a camera body having an interchangeable viewfinder includes a reflex mirror 1, a focusing plate 2, a condenser lens 3, a front shutter plane 6 which defines the location of the front shutter curtain of a focal plane shutter, a rear shutter plane 6' which defines the location of the rear curtain of the focal plane shutter. Also forming part of the camera body is a back cover 8 hinged to the remainder of the camera body by means of a hinge 8c and hinge pin 8b terminating in ends 8a and 8d. In the camera body, a light guide 15 is located behind the film plane along which a film 7 is mounted and travels during normal operation. A shading or cover plate 13 covers the light guide 15 and prevents entry of light thereto when the interchangeable viewfinder is dismounted from the camera body.

The interchangeable viewfinder 29 includes a pentagonal prism 4, an eyepiece 5, a data illuminating lamp 10, a data sheet 11, a mask 21, an image forming lens 12, a semipermeable mirror 23, a power source 16 for the lamp and its associated circuit, and a switch 17. The interchangeable viewfinder can be mounted and dismounted along the direction of the arrows in a conventional manner.

The data sheet is a transparent sheet in which data signals such as letters, figures and so on showing optional data such as the date, the series number, or the name of the photographer are provided. The data sheet is to be placed on the mask 21 provided between the image forming lens 12 and the lamp 10 through the slit provided on the view finder cover 9.

The light guide 15 is kept by the back cover 8, by cutting open the upper part or a part of the film press plate not shown in the drawing. Thus only the part of the back cover needed for keeping the light guide 15 can been drawn backward according to the necessity. The light shading plate 13 is mounted on the camera body by means of a shaft 13a and urged by means of a spring 14 so as to cover the upper surface of the light guide 15 when the view finder is dismounted in order to prevent light from entering the camera body.

When the view finder 29 is mounted on the camera body, by sliding it along the direction of the arrow, and when it reaches the end of the sliding motion the projection 9a of the finder cover 9 pushes the arm 13b of the light shading plate so as to retract the light shading plate 13 from the upper surface of the light guide against the force of the spring 14.

When the back cover is closed at this time, the image forming lens 12 is positioned over the light guide 15. Thus the optical path for data printing in the view finder is connected to that in the camera.

The half permeable mirror 23 is provided slantly between the mask 21 and the image forming lens 12 so as to display the data signal in the view finder. Thus a part of the light beam having passed through the data sheet 11 is reflected on the surface of the reflecting surface, enters into the pentagonal prism 4, is again reflected on the reflecting surface 4a and observed through the eye piece lens 5. When in the above mentioned condition the switch 17 is closed, the lamp circuit is closed, the lamp 10 is lit to illuminate the data sheet 11. Consequently, the light beam having passed through the data sheet enters into the light guide 15 through the image forming lens 12, is reflected on its slant face 15b so as to form an image on the back surface of the film, in such a manner that the image of the data signal on the data sheet 11 is recorded on the film.

Beside this the data signal can be observed in the view finder in the above mentioned way. Thus it can be confirmed that the data has been printed.

Figure 2:
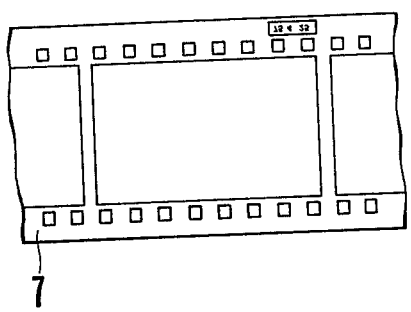
FIG. 2 shows a film on which a data is printed in plane view.

FIG. 2 shows the film in which the data is printed, seen from the side of the photographic lens, whereby the image of the data is printed outside of the perforation, in accordance with the data sheet it is possible to print the data at other positions.

In the above mentioned arrangement, it is of importance that the data signal is provided in one sheet which can be put in and out through the slit in the finder cover. Also a signal source having various data signals may be provided in the finder in such a manner that by means of an operation from outside the data to be printed is selected optionally.

Figure 3:
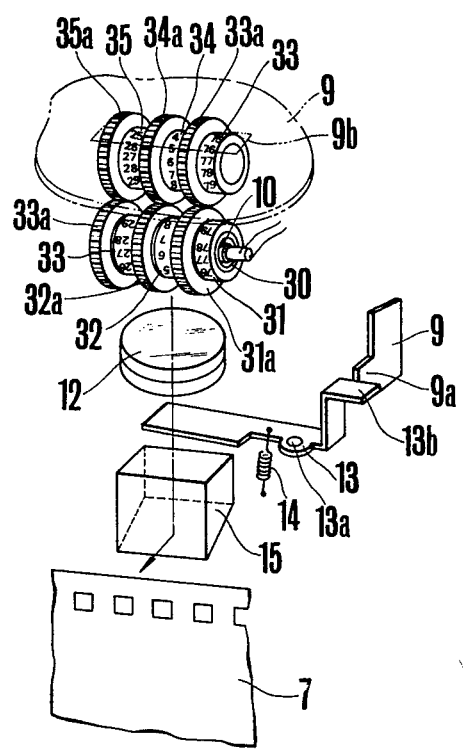
FIG. 3 shows a variation of a part shown in FIG. 1 in perspective view.

FIG. 3 shows such an embodiment. In the drawing, data drums 31, 32, 33 for the year, the month and the date, are mounted rotatably around the hollow cylinder 30 and respectively secure to a gear, 31a, 32a, 33a. Further 33, 34 and 35 are the display drums having figures for the year, the month and the date, being respectively equiped as one body with a gear 33a, 34a, 35a. A part of the drums project out of the window 9b provided in the finder cover 9 in such a manner that as the operation is carried out, the figures can be observed from outside.

The data drum is such that transparent figures are provided on an opaque background, that a slit is provided on the above mentioned hollow cylinder 30, that the lamp 10 is loaded in the hollow part, and that the corresponding figures on the data drum are arranged facing the above mentioned slit when the data figures on the display drum are set in the window 9b by rotating the set gear. Other components are same as in the embodiment shown in FIG. 1.

When in the above mentioned structure the switch is closed the lamp 10 is lit. This illuminates the figures in a line on the data drum through the slit in the cylinder 30 in such a manner that the light beam forms an image on the back surface of the film through the lens 12 and the light guide 15 so as to print the data.

Figure 4:
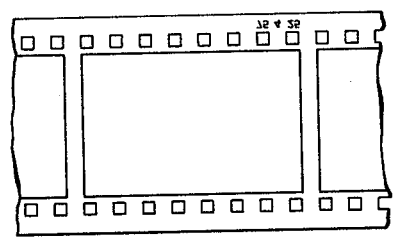
FIG. 4 shows another film on which a data is printed in the plane view.
Figure 5:
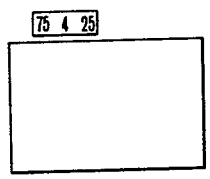
FIG. 5 shows a data displayed in the view finder in plane view.
Figure 6:
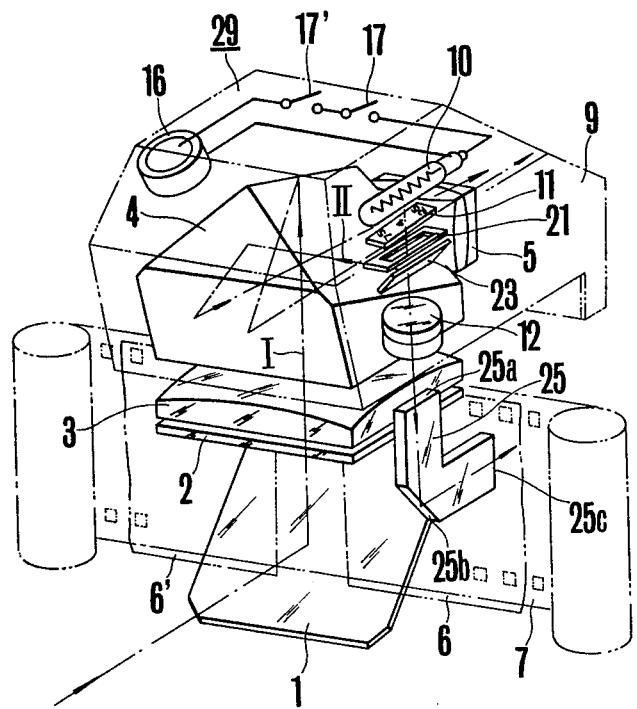
FIG. 6 shows another embodiment in perspective view.

FIG. 4 shows the printed result, while FIG. 5 shows the displayed result in the finder. FIG. 6 shows an embodiment in which the data can be printed on the front surface of the film. Here in the same way as in the embodiment shown in FIG. 1, the data sheet 11, the mask 22, the half permeable mirror 23, the image forming lens 12 and the lamp are built in the exchangeable finder 29, while although in FIG. 1, the data sheet 11 is arranged parallel to the plane of the film behind the pentagonal prism, in the present embodiment, the data sheet 11 is arranged perpendicular to the plane of the film beside the pentagonal prism. Further the light incident plane of the image forming lens 12 and that of the light guide are situated below the data sheet, the light guide 25 is arranged beside the focus plate and the mirror and the plane 25C at which the light beam goes out of the light guide is arranged in front of the shutter plane 6 and close to it. In this arrangement, even when the interchangeable finder is detached the light beam entering from the light guide is covered by means of the shutter plane, not reaching the film so that there is no need for providing the light shading plate 13 as is shown in FIG. 1. As it is necessary to carry out the printing of the data while the shutter plane is opened, in series with the switch 17 of the lamp circuit a switch there is provided 17' to be closed in functional engagement of the shutter release.

When with this arrangement, the data is printed, the switch 17 is closed so as to prepare data printing and then the shutter button is pushed, in such a manner that in a conventional way the mirror 1 is raised up, the diaphragm not shown in the drawing is automatically operated, the shutter plane is opened and at the same time, the switch 17' in functional engagement with the shutter button is closed so as to produce the light. In consequence, in the same way as in the above mentioned case the light beam having passed the data sheet passes through the image forming lens 12, enters into the light guide 25 at the incident plane 25a, is reflected on the reflecting plane 25b and goes out of the light guide 25 at the plane 25c so as to form an image on the film plane in simultaneously with photographing the data is printed.

On the other hand, the light beam split by means of the half permeable mirror 23 enters into the pentagonal prism 4 through the one roof plane, is reflected by means of the other roof plane and the front reflecting plane and goes out of the pentagonal prism 4 through the eye piece 5 so as to display data in the finder.

FIG. 7 shows a film plane, seen from the front, while FIG. 8 shows a displayed state of the data in the finder.

In the present embodiment, as explained above, the data printing light beam reaches the film plane from the front plane of the shutter so that it is possible to confirm the data set in the finder by putting in the lamp at any optional time.

FIG. 9 shows the switch circuit for the above.

In FIG. 9, battery 16 is the power source, 10 the lamp and 17 the main switch to be manually closed in accordance with necessity for data printing or observation. 20 is the X contact at the camera to be connected to the lamp circuit by means of the terminals 20a, 20b provided at the the camera and the terminals 18a, 18b provided at the interchangeable finder. 19a display switch 19 is connected in parallel to the X contact 20.

When in the closed state of the switch 17, the display switch 19 is closed, the lamp 10 is lit up so as to illuminate the data sheet as mentioned above so that the set data is displayed in the finder.

When then the shutter is released and the front shutter plane starts to run, the X contact is closed and the lamp 20 is lit up, whereby the data is printed on the film. Then the rear shutter plane starts to run and the shutter is closed while at the same time the lamp is put out. The display switch 19 can be constructed as a manual push button switch in such a manner that the lamp is lit up only when the button is pushed for observation and put out when the button is freed. It can also be designed in such a manner that when the button is pushed slightly the lamp is lit up for display. Thus the lamp is put out when the button is freed, while at the time of taking a photograph the light is lit up at the preliminary stroke and continues on lighting during the operation of the shutter in such a manner that the contact with the X contact can be eliminated.

As explained above in accordance with the present invention the interchangeable finder construction is equipped with the signal source while a light path connecting means is provided between the finder and the camera body so that it is possible to obtain a single reflex camera with proper dimension and operability, capable of printing data on the film, whereby when the data printing is not needed at all the finder can be exchanged for the ordinary or other special finder, which is quite profitable in the camera system.

What is claimed is:

1. A data recording device for a camera having a body with a film plane and having an interchangeable finder with a body detachably mounted on the camera body, comprising:
    a data illumination device in the finder body,
    a data signal source provided in the finder body,
    first optical path forming means forming a first optical path in the finder body, and
    second optical path forming means forming a second optical path in the camera body,
    said first and second optical path forming means are aligned to produce an optical path for passage of a signal light beam from the data signal source to the film plane in the camera when the finder body is mounted on the camera.

2. A data recording device for a camera in accordance with claim 1, further comprising an optical means for conducting the data signal light beam to the finder optical path.

3. A data recording device according to claim 1, wherein said second optical path forming means forms a light inlet to the second optical path in the camera body, said recording device further comprising light shading means for covering the inlet of the second optical path, said covering means being movably mounted on the camera body and engaging with the finder body when the body is mounted on the camera body so that said covering means is retracted from its covering position to align the first optical path with the second optical path.

* * * * *